Sept. 20, 1949. C. B. BECKWELL 2,482,314
GAFF HOOK
Filed Oct. 29, 1947
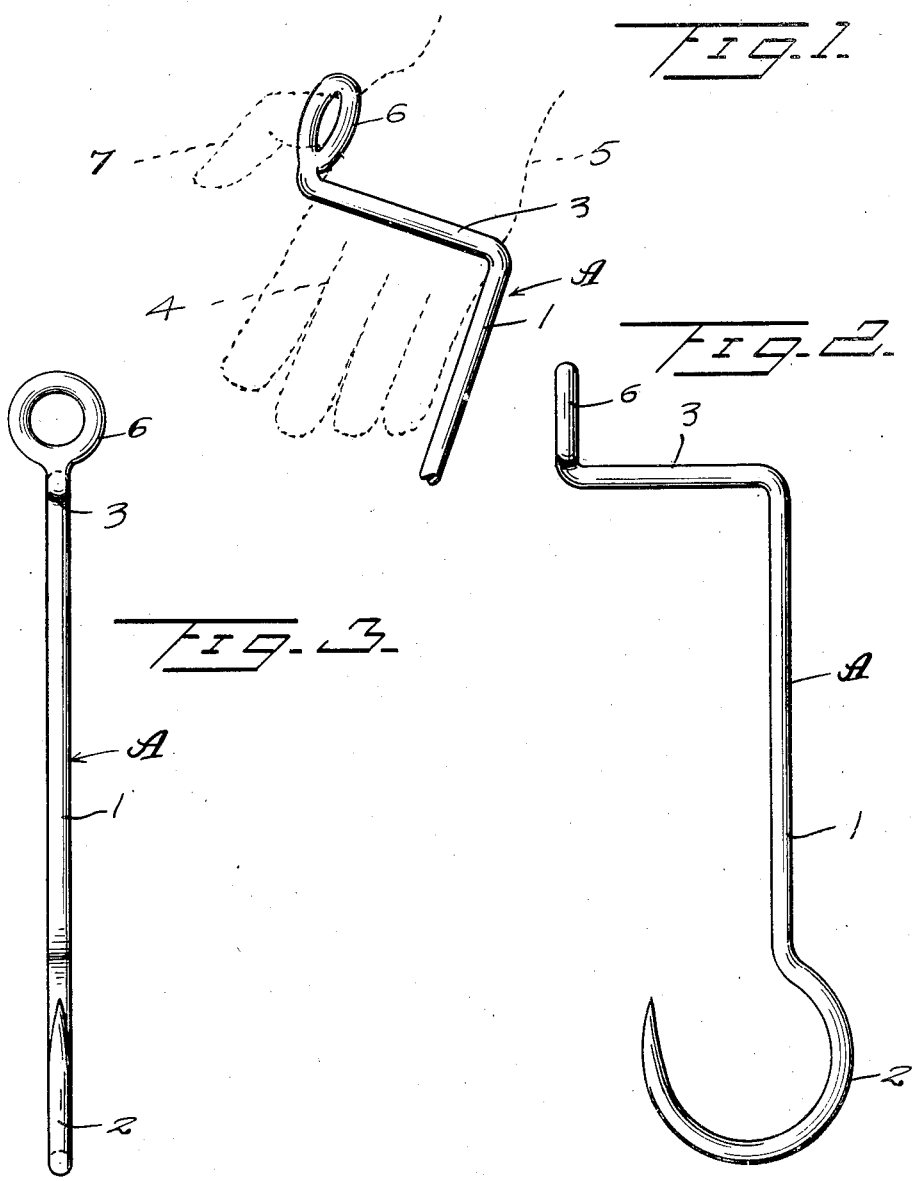
Inventor
CLARENCE B. BECKWELL
By John Patten Duffie
Atty.

Patented Sept. 20, 1949

2,482,314

UNITED STATES PATENT OFFICE 2,482,314

GAFF HOOK

Clarence B. Beckwell, Superior, Wis.

Application October 29, 1947, Serial No. 782,894

1 Claim. (Cl. 43—5)

This invention relates to new and useful improvements in gaff hooks for fishermen.

One object of my invention is to provide a gaff hook that may be held by the same hand that the fisherman uses in reeling in a fish, and may be used to advantage where the fish is big enough to require "gaffing" and without interfering in any way with the reeling operation.

A further object of my invention is to provide a gaff hook of the character specified that may be cast or made in a single piece, and is simple and economical in construction, and highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a partial perspective view, illustrating the application of my invention.

Figure 2 is a side elevational view of my gaff hook, and

Figure 3 is a front edge view.

Referring to the drawings for a more particular description of my invention, and in which like parts are designated by like reference characters throughout the several views, A designates my novel gaff hook, as a whole, which is preferably cast or forged in a single piece, as shown, and essentially comprises the straight rod-like body portion 1, formed at its lower end with a substantially U-shaped hook 2, and bent at right angles at its upper end to form the straight transverse handle 3, which extends across and fits in the palm 4 of the hand 5.

In carrying out my invention, the outer or front end of the straight handle 3 is likewise bent substantially at right angles to form the perpendicularly disposed ring or loop 6, which fits around or encircles the base of the thumb 7 and prevents the gaff hook from slipping out of the hand.

My novel gaff hook may be held by the same hand that the fisherman uses in reeling in a fish, and may be used to advantage where the fish is big enough to require "gaffing" and without interfering in any way with the reeling operation.

From the foregoing description taken in connection with the drawing, it is thought that the construction, operation and advantages of my invention will be readily understood, without requiring a more extended explanation.

Having described my invention, what I claim as new and desire to secure by Letters Patent, is:

A gaff hook of the character specified, formed in a single piece, said gaff hook comprising a straight rod-like body portion formed at its lower end with a substantially U-shaped hook and at its upper end with a right angularly bent handle adapted to extend across and fit in the palm of the hand, with the outer or front end of the handle terminating in a circular ring disposed perpendicularly to said handle and adapted to fit around the base of the thumb and prevent the hook from slipping out of the hand.

CLARENCE B. BECKWELL.

REFERENCES CITED

The following references are of record in the file of this patent:

UNITED STATES PATENTS

| Number | Name | Date |
|---|---|---|
| D. 115,764 | O'Brien | July 18, 1939 |
| 310,003 | Welshans | Dec. 30, 1884 |
| 408,565 | Woodworth | Aug. 6, 1889 |

FOREIGN PATENTS

| Number | Country | Date |
|---|---|---|
| 56,720 | Sweden | May 20, 1924 |